United States Patent
Noll et al.

(10) Patent No.: US 9,689,521 B2
(45) Date of Patent: Jun. 27, 2017

(54) FASTENING DEVICE, HANGING DEVICE, AND METHOD FOR MOUNTING A HANGING DEVICE

(71) Applicant: Anvis Deutschland GmbH, Steinau an der Straβe (DE)

(72) Inventors: Alexander Noll, Bad Soden-Salmunster (DE); Volker Kalkhof, Gelnhausen (DE)

(73) Assignee: Anvis Deutschland GmbH, Steinau an der Strasse (DE)

( * ) Notice: Subject to any disclaimer, the term of this patent is extended or adjusted under 35 U.S.C. 154(b) by 0 days.

(21) Appl. No.: 14/681,286

(22) Filed: Apr. 8, 2015

(65) Prior Publication Data

US 2015/0292666 A1    Oct. 15, 2015

(30) Foreign Application Priority Data

Apr. 9, 2014 (DE) .................. 10 2014 005 286

(51) Int. Cl.
| | |
|---|---|
| *F16L 3/00* | (2006.01) |
| *F16L 55/035* | (2006.01) |
| *B60K 13/04* | (2006.01) |
| *F16L 55/033* | (2006.01) |
| *F01N 13/18* | (2010.01) |

(52) U.S. Cl.
CPC ............ *F16L 55/035* (2013.01); *B60K 13/04* (2013.01); *F01N 13/1811* (2013.01); *F01N 13/1822* (2013.01); *F16L 55/0337* (2013.01); *F01N 2530/22* (2013.01); *F16L 3/00* (2013.01)

(58) Field of Classification Search
USPC ........... 248/317, 75, 220.21, 220.22, 220.43, 248/224.8, 229.1, 229.2, 49, 58, 61, 62, 248/63, 65, 74.4
See application file for complete search history.

(56) References Cited

U.S. PATENT DOCUMENTS

| | | | | |
|---|---|---|---|---|
| 3,104,428 A | * | 9/1963 | Benham ................ | E05D 5/0215 16/235 |
| 4,799,444 A | * | 1/1989 | Lisowski .................. | F16B 2/06 114/221 R |
| 5,482,234 A | * | 1/1996 | Lyon ......................... | F16L 3/12 248/74.1 |
| 5,704,232 A | * | 1/1998 | Kuo ......................... | B62J 11/00 248/229.1 |

(Continued)

FOREIGN PATENT DOCUMENTS

DE    103 28 020 A1    1/2005

*Primary Examiner* — Alfred Wujciak
(74) *Attorney, Agent, or Firm* — Armstrong Teasdale LLP (57) ABSTRACT

A fastening device for fastening an elastic hang-on part for hanging at least a part of an exhaust system on a motor vehicle is provided. The fastening device includes a flange part having a first holding pin, and a mounting part having a second holding pin, wherein the first holding pin and the second holding pin are adapted to, together, hold the elastic hang-on part, wherein the flange part includes a first side portion and a flange plate, wherein the first holding pin extends substantially perpendicular away from the first side portion and the flange plate extends substantially perpendicular in the same direction as the first holding pin away from the first side portion, and wherein the mounting part includes a second side portion and a mounting plate.

19 Claims, 8 Drawing Sheets

(56) References Cited

U.S. PATENT DOCUMENTS

| | | | | |
|---|---|---|---|---|
| 5,794,897 A | * | 8/1998 | Jobin | H02G 7/053 |
| | | | | 24/459 |
| 5,833,189 A | * | 11/1998 | Rossman | A47G 19/10 |
| | | | | 248/221.11 |
| 6,079,673 A | * | 6/2000 | Cox | F16L 3/1041 |
| | | | | 174/40 R |
| 2013/0112817 A1 | * | 5/2013 | Unger | F16L 3/1025 |
| | | | | 248/74.4 |

* cited by examiner

FASTENING DEVICE, HANGING DEVICE, AND METHOD FOR MOUNTING A HANGING DEVICE

CROSS REFERENCE TO RELATED APPLICATIONS

This application claims the benefit of DE Patent Application No. 10 2014 005 286.9 filed Apr. 9, 2014, which is hereby incorporated by reference in its entirety.

BACKGROUND OF THE DISCLOSURE

The present invention relates to a fastening device for fastening an elastic hang-on part for hanging at least a part of an exhaust system on a motor vehicle, a hanging device having such a fastening device, and a method for mounting a hanging device.

Hanging devices for hanging an exhaust system on a motor vehicle usually have a rigid support structure to be fastened to a chassis part, such as the floor assembly. An elastomeric body is provided to compensate for vibrations of the exhaust system, via which body the exhaust system hangs on the support structure. The elastomeric body is pivotably fastened to the support structure. The support structure is often realized by hooks that engage the elastomeric body. Also, a hook or a loop structure is used to couple the exhaust system to the elastomeric body.

Common hanging devices have the disadvantage that due to the variety of exhaust systems and their associated different natural vibration characteristics, different hanging devices to be configured must be provided. In the case of damage or any other functional impairment, for example owing to material fatigue of the elastomeric body, the entire hanging device along with the hook structure and connection must be replaced.

Hanging devices having a two-part support structure for a simplified assembly and replaceability of the elastomeric body are known.

DE 103 28 020 A1 discloses a hanging device for the vibration-damping fastening of an exhaust system to a vehicle component, wherein a U-shaped support structure is formed by two contour plates that are inserted into each other.

DE 10 2006 010 973 A1 discloses a hanging device having a two-part support structure, wherein the support structure includes a flange to be fastened to a chassis part and a mounting element. The flange has a first side portion from which a flange plate and a holding pin extend perpendicular thereto. The mounting element also has a second side portion from which a flange plate and a holding pin extend perpendicular thereto. In the mounting end position, the holding pins are aligned to each other, the flange plate rests on the mounting plate, and locking projections arranged on the upper side of the mounting plate are inserted into locking recesses formed in the flange plate. For mounting the support structure, the support structure is at first brought to a mounting intermediate position in which the respective holding pins of the flange and of the mounting element are inserted into a through hole of an elastomeric body from both sides, wherein the flange and the mounting element are twisted with respect to each other such that the flange plate and the mounting plate are spaced from each other. By mutual twisting of the flange and of the mounting element, the flange plate and the mounting plate are moved toward each other until the locking projections engage the locking recesses and the flange plate rests on the mounting plate.

The above-described support structure has the disadvantage that it is only designed for one hanging device, in which the flange plate and the mounting plate are arranged in a laterally offset way with respect to the longitudinal axis of the through hole of the elastomeric body (with respect to the pivot axis of the elastomeric body). Moreover, for mounting the support structure, it is necessary to perform two steps, i.e. inserting the holding pins of the flange and of the mounting element into the through hole of the elastomeric body and subsequent twisting of the flange and of the mounting element with respect to each other.

BRIEF DESCRIPTION OF THE DISCLOSURE

The systems and methods described herein provide a support structure or a fastening device for fastening an elastic hang-on part, which permits an arrangement of the flange plate that is offset in the direction of the pivot axis of the hang-on part, and which is easy to mount.

According to a first aspect, a fastening device for fastening an elastic hang-on part for hanging at least a part of an exhaust system on a motor vehicle is provided. The fastening device includes a flange part having a first holding pin; and a mounting part having a second holding pin, wherein the first holding pin and the second holding pin are adapted to, together, hold the elastic hang-on part. The flange part includes a first side portion and a flange plate, wherein the first holding pin extends substantially perpendicular away from the first side portion and the flange plate extends substantially perpendicular in the same direction as the first holding pin away from the first side portion, wherein the mounting part includes a second side portion and a mounting plate, and wherein the second holding pin extends substantially perpendicular away from the second side portion and the mounting plate extends substantially perpendicular in a direction opposite to the extension direction of the second holding pin away from the second side portion. The flange plate and the mounting plate form a locking mechanism that includes at least a locking projection and at least a locking recess, wherein in a mounting end position, the first holding pin and the second holding pin face each other and are aligned to each other, the flange plate rests against the mounting plate, and the locking projection is inserted into the locking recess, and wherein the flange part and the mounting part are configured such that they can be brought to the mounting end position by a movement toward each other substantially along the extension direction of the holding pins.

The flange plate may include a fastening hole for passing through a screw or another fastening means for fastening the fastening device to the motor vehicle. The fastening hole may be formed in a region of the flange plate that is spaced from the first side portion of the flange part. In particular, the fastening hole may be formed in an end region of the flange plate that faces away from the first side portion, wherein between the end region and the first side portion there is provided a bridging region of the flange plate, which in the mounting end position extends above, or across, the first and second holding pins and bridges the distance between the side portions. A bearing surface for abutment on the vehicle chassis may be formed around the fastening hole. The bearing surface may be formed annularly around the fastening hole. The bearing surface may project from the flange plate.

The mounting plate may also include a fastening hole for passing through the screw at the corresponding location, so that in the mounting end position, when the flange plate rests on or abuts the mounting plate, a continuous fastening hole through the flange plate and the mounting plate is formed. When the fastening device is screwed to the motor vehicle, the flange plate and the mounting plate are clamped between the screw head and the vehicle chassis. Alternatively, the mounting plate may be dimensioned such that in the mounting end position the region below the fastening hole of the flange plate is exposed.

Both the first and second holding pins, the flange plate, and the mounting plate extend substantially perpendicular to the corresponding side portion away from the side portion, wherein the mounting plate extends in a direction opposite to the extension direction of the second holding pin. By contrast, the flange plate extends in the same direction as the first holding pin. The flange plate, the mounting plate, and the holding pins do not have to extend exactly perpendicular away from the side portion. It is only important that both the flange plate and the first holding pin as well as the mounting plate and the second holding pin be formed substantially parallel to each other. In the mounting end position, the flange plate bridges the distance between the side portions and rests on the mounting plate.

The first and second holding pins serve to pivotably hold the elastic hang-on part. To this end, they can be inserted into a hanging hole of the hang-on part from both sides. In the mounting end position, the first holding pin and the second holding pin are aligned to each other, which means that the longitudinal axis of the first holding pin and the longitudinal axis of the second holding pin are substantially identical or overlap. In the mounting end position, the first and second holding pins may in particular form a substantially continuous cylinder. The distance between the front ends of the holding pins in the mounting end position is dimensioned to be as small as possible, so that a largest possible holding surface for the elastic hang-on part is provided. However, the distance should be selected to be large enough to prevent the front ends of the holding pins to collide in the mounting process due to manufacturing tolerances, so that the fastening device cannot, or only with difficulty, be brought into the mounting end position. The holding pins do not have to be formed in a cylinder shape though. The holding pins only have to be able to hold the elastic hang-on part pivotably, which is also possible by interposition of a bearing of a sleeve. For improved mobility of the holding pins with respect to each other, the front end of the first holding pin and/or the front end of the second holding pin may be rounded off or formed to be spherical.

The side portions of the flange part and of the mounting part may serve as a lateral guide of the elastic hang-on part. To this end, the height and/or the width of the side portions may be dimensioned such that an optimum lateral guidance of the hang-on part is ensured. This is particularly enabled by the close arrangement of the side portions from the flange plate and from the mounting plate, as the side portions have a greater rigidity thereby. The first side portion of the flange part and the second side portion of the mounting part may be formed to be different. One side portion may be formed in a plate shape, for example.

The locking projection may be a latching nose in the form of a cylindrical projection, and the locking recess may be a cylindrical bore, for example. However, the locking recess does not have to be a continuous recess, i.e. the locking recess does not have to exhibit an opening on both sides of the flange plate or of the mounting plate. It is also possible for the locking recess to be a depression or a groove. The fit of locking projection and locking recess may be selected such that the locking projection has a certain play in the locking recess. The upper part of the locking projection may be sloped and/or tapered in order to facilitate sliding of the flange plate and of the mounting plate onto each other.

The height of the locking recess can be selected such that a sufficient locking effect is obtained, but that the locking projection does not project too greatly on the other side of the locking recess. Parts of the locking projection that project from the locking recess may contact the bearing surface of the vehicle chassis or the screw head during fastening of the fastening device, which may inhibit a correct fastening. The height and arrangement of the locking projection may be selected such that a correct fastening of the fastening device to the vehicle chassis by means of a fastening element is possible. However, parts of the locking projection that project from the locking recess may also be removed (e.g. milled away) or be hit until flat after the assembly of the fastening device, whereby an inseparable connection of the flange part and the mounting part is obtained.

The arrangement of the locking projection and the locking recess can influence the locking behavior. For example, locking projections/recesses arranged on the flange or mounting plate near the respective side portion exhibit a stronger locking effect, but are more difficult to mount. Locking projections/recesses arranged on the flange or mounting plate further away from the respective side portion, however, exhibit a weaker locking effect, but can be mounted more easily.

The locking effect is obtained by the locking projection and the locking recess in that, from the mounting end position, the locking projection can only be moved out of the locking recess if during this movement the flange part and the mounting part are brought into a displacement position in which the first holding pin and the second holding pin are not aligned to each other. "Not aligned to each other" refers to when there is an angle between the longitudinal axes of the holding pins and/or that the longitudinal axes of the holding pins are spaced from each other. Therefore, if the holding pins are inserted into a hanging hole of an elastic hang-on part, the holding pins are held in the mutually aligned position by the inner wall of the hanging hole, so that the flange part and the mounting part can only be brought to the displacement position by overcoming a force for deforming the hanging hole of the elastic hang-on part. In this way, the flange part and the mounting part are held in the mounting end position by means of the locking projection and the locking recess and prevent the parts from falling apart.

The flange part and the mounting part are configured such that they can be brought to the mounting end position from the two-part position by a movement toward each other substantially along the extension direction or longitudinal axes of the holding pins. In the movement toward each other substantially along the extension direction of the holding pins, the first holding pin and the second holding pin are substantially aligned to each other and are moved toward each other substantially along a common longitudinal axis. In this mounting process, the flange plate is pushed over the mounting plate and the flange plate slides across the mounting plate until the locking projection latches in the locking recess. In order for the locking projection to be inserted into the locking recess by a movement of the flange part and of the mounting part toward each other substantially along the extension direction of the holding pins, during this movement, the flange part and the mounting part are meanwhile brought to a displacement position in which the first holding pin and the second holding pin are not aligned to each other.

During the movement substantially along the extension direction or longitudinal axes of the holding pins, i.e. during the mounting process, a displacement position is overcome. Thus, if the holding pins are inserted into a hanging hole of an elastic hang-on part to mount the fastening device, the holding pins are held in or guide to the mutually aligned position by the inner wall of the hanging hole, so that the flange part and the mounting part can only be brought to the displacement position by overcoming a force for deforming the hanging hole of the elastic hang-on part, and subsequently can be brought to the mounting end position. The locking projection snaps into the locking recess and latches therein as soon as the flange part and the mounting part have been pushed sufficiently close together.

The flange part and the mounting part may be made of metal. For example, the flange part and the mounting part may be produced by aluminum die casting. Alternatively, the flange part and/or the mounting part may be made of plastics. A combination of materials is possible as well, e.g. an aluminum flange part and a plastics mounting part.

Advantageously, the systems and methods described herein provide a fastening device that has an arrangement of the flange plate which is offset from the hang-on part in the direction of the pivot axis of the hang-on part, and that can be mounted easily with one mounting movement.

The mounting plate may include the locking projection and the flange plate may include the locking recess, or the flange plate may include the locking projection and the mounting plate may include the locking recess.

If the fastening device includes several locking projections and locking recesses, the flange plate and the mounting plate may each include both one or more locking projections and one or more locking recesses.

In the mounting end position, the locking projection and the locking recess may be arranged substantially symmetrically to a plane that is perpendicular to the flange plate and that includes the longitudinal axes of the first holding pin and of the second holding pin.

In other words, the locking projection or the locking recess on the flange plate may be arranged mirror-symmetrically with respect to a line that represents a perpendicular projection of the longitudinal axis of the first holding pin onto the flange plate. Likewise, the locking projection or the locking recess on the mounting plate may be arranged mirror-symmetrically with respect to a line that represents a perpendicular projection of the longitudinal axis of the second holding pin onto the mounting plate. "Arranged symmetrically" refers to when the center of the locking projection or of the locking recess is in the plane of symmetry (or on the axis of symmetry), or that a pair of locking projections or locking recesses in arranged at an equal distance from the plane of symmetry (or from the axis of symmetry).

Advantageously, the symmetrical arrangement of the locking projection and of the locking recess prevents forces from acting between the flange plate and the mounting plate during the mounting process, which forces would lead to twisting of the flange part and of the mounting part with respect to each other, specifically twisting about the mutually aligned longitudinal axes of the holding pins. In other words, the symmetrical arrangement of the one or more locking projections and of the one or more locking recesses facilitates ensuring that, in the mounting process, no momentums act on the flange part and on the mounting part around the longitudinal axes of the holding pins.

The fastening hole for passing through a fastening means in the flange plate and/or in the mounting plate may also be arranged substantially symmetrically with respect to the plane that is perpendicular to the flange plate and includes the longitudinal axes of the first holding pin and of the second holding pin. If the fastening device includes several locking projections and locking recesses, they may be arranged around the fastening hole, wherein a specific distance between the fastening hole and the locking projections and locking recesses may be left in order to ensure a good bearing surface on the vehicle chassis or for the screw head. The fastening device may include one, two, three, four, five, or six locking projections and locking recesses.

The locking projection may be formed as an annular projection.

Here, the annular projection may be formed concentrically with the fastening hole for passing through the fastening means. In other words, the annular projection may be arranged around the fastening hole. The inner wall of the annular projection may correspond to the inner wall of the fastening hole or be adjacent thereto, or the inner wall of the annular projection may be spaced from the inner wall of the fastening hole.

The locking recess may be formed as an annular groove or as a cylindrical hole.

In the case of a design with an annular groove, an annular projection may be inserted into the groove such that both the inner wall and the outer wall of the annular projection can at least partly contact the inner walls of the annular groove. In the case of a design with a cylindrical hole, only the outer wall of the annular projection can contact the inner wall of the cylindrical hole.

Moreover, it is conceivable to design the locking projection and/or the locking recess in a segmented fashion. For example, portions of the annular projection and/or of the annular groove may be omitted on purpose in order to thus ensure a correct alignment of the flange part and of the mounting part with respect to each other, or to facilitate the assembly.

The locking projection may include a chamfer.

The chamfer may be inclined toward the side of the locking projection which faces in the extension direction of the corresponding holding pin. The chamfer advantageously allows the flange plate and the mounting plate to be easily slid or pushed over each other. Further, by means of the chamfer, it is possible to prevent the front edge of the flange plate and/or of the mounting plate from bumping against the locking projection and from impeding the mounting movement of the flange part and the mounting part with respect to each other. If the fastening device includes several locking projections, in particular the frontmost locking projection may have the chamfer, wherein "the frontmost locking projection" refers to the frontmost locking projection on the flange plate or the mounting plate in the extension direction of the holding pin.

The flange plate and/or the mounting plate may include a guide for guiding the locking projection.

The guide may be formed on the front edge of the flange plate and/or on the connecting edge of mounting plate and second side portion. The guide may be formed as a groove having a ramp-shaped bottom. Therefore, the guide may also be referred to as a guiding chamfer. The width of the groove is dimensioned to be larger than the diameter of the locking projection. The guide advantageously allows the flange plate and the mounting plate to be easily slid or pushed over each other. Further, the guide can prevent the locking projection from bumping against the front edge of the flange plate and/or of the mounting plate and from impeding the mounting movement of the flange part and the mounting part with respect to each other. It is advantageous to provide a guide for the frontmost locking projection(s). However, it is also possible to provide one guide for each locking projection. Alternatively or in addition, the flange plate and/or the mounting plate may include lateral guide collars. The guide collar may extend along the lateral edges of the flange plate and/or of the mounting plate substantially in parallel with the extension direction of the holding pins. The guide collar can ensure lateral guidance of the flange plate and the mounting plate with respect to each other. At one end, the guide collar may be connected at least partly to the side portion, which can increase the rigidity of the flange part and/or of the mounting part.

The first holding pin and the second holding pin may have approximately the same length.

Due to the first holding pin and the second holding pin having approximately the same length, an optimum force distribution of the force from the hang-on part to the flange part and to the mounting part can be ensured. However, other length ratios are possible as well.

The first holding pin of the flange part may have a smaller diameter than the second holding pin of the mounting part.

Due to the smaller diameter of the first holding pin of the flange part, improved mobility of the first holding pin inserted into the hanging hole of the hang-on part can be ensured. Thereby, the flange part can be brought to the displacement position with less force, which facilitates the mounting process.

According to a second aspect, a hanging device for hanging at least part of an exhaust system on a motor vehicle is provided. The hanging device includes a fastening device as described herein; and an elastic hang-on part; wherein the first holding pin and the second holding pin are arranged in a hanging hole of the elastic hang-on part in the mounting end position.

The elastic hang-on part may be an elastomeric injection-molded part. The elastic hang-on part may include a hang-on hole for pivotably receiving a fastening pin of an exhaust system. In the hanging hole and/or in the hang-on hole there may be formed one or more ribs on the inner wall, which can provide for a better hold of the holding pins and the fastening pin. The hanging hole and the holding pins may be dimensioned such that a certain insertion force is required to insert a holding pin into the hanging hole. The hanging hole may have a larger-diameter portion to ensure improved mobility of the first holding pin of the flange part and/or of the second holding pin of the mounting part therein. The larger-diameter portion in the hanging hole may also be dimensioned such that the first and/or second holding pin(s) can be arranged in the hanging hole with some play. It is only important that the locking effect can be obtained.

The hanging hole is open on both sides and forms the pivot axis of the hang-on part relative to the fastening device. To mount the hanging device, the first holding pin and the second holding pin can be inserted into the hanging hole, and the flange part and the mounting part can be brought to the mounting end position. In the mounting end position, the first holding pin, the second holding pin, and the hanging hole are aligned to each other, i.e. their longitudinal axes overlap or are identical. The above explanations concerning the hang-on part in connection with the fastening device apply to the hang-on part of the hanging device as well.

According to a third aspect, a method for mounting a hanging device for hanging at least a part of an exhaust system on a motor vehicle is provided. The method includes providing a fastening device as described herein; providing an elastic hang-on part having a hanging hole; inserting the second holding pin of the mounting part into the hanging hole from a side of the hanging hole; and inserting the first holding pin of the flange part into the hanging hole from another side of the hanging hole, so that the flange plate is pushed over the mounting plate until the locking projection latches in the locking recess.

In the insertion of the first and second holding pins into the hanging hole, the holding pins are aligned to each other by the inner wall of the hanging wall and guided along the longitudinal axes or along the extension direction of the holding pins, so that the flange part and the mounting part are moved toward each other substantially along the extension direction of the holding pins and can be brought to the mounting end position. Here, the flange plate is pushed over the mounting plate, and the flange plate slides over the mounting plate until the locking projection latches in the locking recess.

In order to be able to insert the locking projection into the locking recess by a movement of the flange part and of the mounting part toward each other substantially along the extension direction of the holding pins, during this movement, the flange part and the mounting part are meanwhile brought to a displacement position in which the first holding pin and the second holding pin are not aligned to each other. During the movement substantially along the extension direction or longitudinal axes of the holding pins, a displacement position is overcome. Thus, if the holding pins are inserted into a hanging hole of an elastic hang-on part to mount the fastening device, the holding pins are held in or guide to the mutually aligned position by the inner wall of the hanging hole, so that the flange part and the mounting part can only be brought to the displacement position by overcoming a force for deforming the hanging hole of the elastic hang-on part, and subsequently can be brought to the mounting end position. The locking projection snaps into the locking recess and latches therein as soon as the flange part and the mounting part have been pushed sufficiently close together.

The second holding pin may be inserted into the hanging hole first, and then the first holding pin. However, the reverse order is possible as well. Alternatively, both holding pins can be inserted into the hanging hole at the same time.

Advantageously, the method can be performed in an automated way. To this end, operation elements may be provided on the flange part and/or on the mounting part, in particular on the side portion thereof. The flange part and/or the mounting part can be gripped by the assembly robot at the operation elements and be mounted in an automated way.

BRIEF DESCRIPTION OF THE DRAWINGS

Further advantages, features, and properties of the disclosure will be explained in more detail with respect to the accompanying drawings, which show.

DETAILED DESCRIPTION OF THE DISCLOSURE

Figures 1A, 1B:
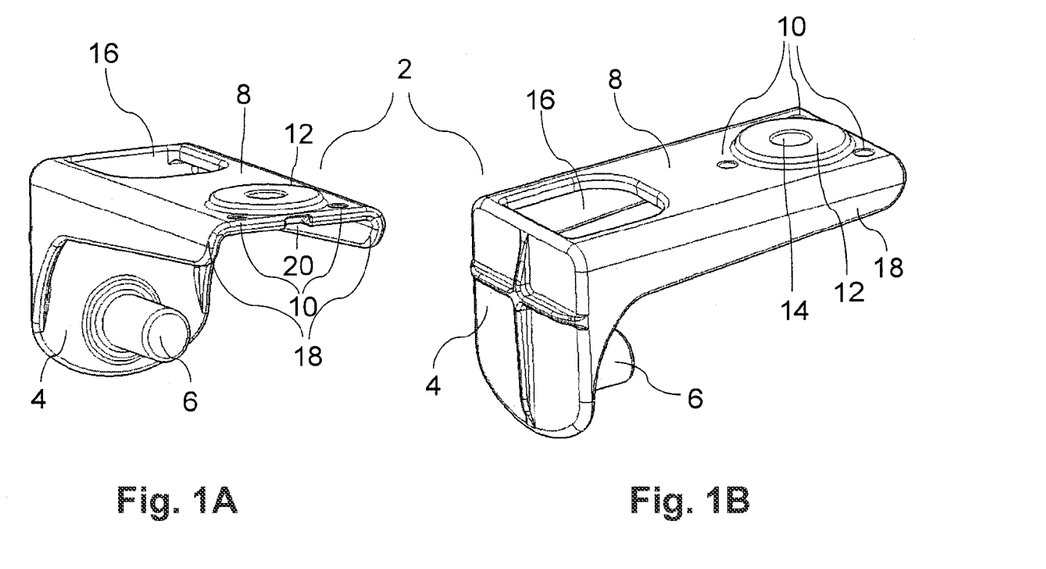
FIGS. 1A and 1B are a flange part according to a first example embodiment in two perspective views.

FIGS. 1A and 1B show a flange part 2 according to a first example embodiment in perspective views. The flange part 2 includes a first side portion 4 from which a first holding pin 6 and a flange plate 8 extend substantially perpendicular thereto. The first holding pin 6 and the flange plate 8 extend from the first side portion 4 in the same direction and are arranged in parallel with each other. In an end region of the flange plate 8, which is spaced from the first side portion 4, three locking recesses 10 for receiving locking projections may be formed.

The locking recesses 10 may be formed around a bearing surface 12 for abutting the vehicle chassis. The bearing surface 12 may be formed around a fastening hole 14 for passing through a fastening means (not shown), for example a screw. The locking recesses 10, the bearing surface 12, and the fastening hole may be arranged symmetrically with respect to a plane that is perpendicular to the flange plate 8 and that includes the longitudinal axis of the first holding pin 6. Moreover, the flange plate 8 may include a decoring opening 16 that allows manufacturing the flange part 2 in an aluminum die casting process, for example.

The flange part 2 may further include a pair of guide collars 18 or guide rails 18, which may be formed on the lateral edges of the flange plate 8. The pair of guide collars 18 may at least partly be connected to the lateral edges of the first side portion 4, which increases the rigidity of the flange part 2. The guide collars 18 may thus also be referred to as stiffening collars or stiffening rails. The guide rails 18 may be formed such that they enclose the mounting plate from both sides, so that the mounting plate can be guided in the guide collar 18 in the extension direction of the first holding pin 6.

A guide 20 for guiding a locking projection may be formed at the front end of the flange plate 8. The front end means the front in the extension direction of the first holding pin 6 or the end of the flange plate 8 that faces away from the first side portion 4. The guide 20 may be formed in a groove shape, wherein the bottom of the groove may be formed in a ramp shape. The guide 20 is open toward the side of the flange plate 8 which abuts the mounting plate 28 in the mounting end position. The guide 20 can effectively prevent the frontmost locking projection 30 from bumping against the front edge of the flange plate 8 in the mounting process and from impeding the mounting process. The frontmost locking projection means the frontmost locking projection in the extension direction of the second holding pin 26 or the locking projection on the mounting plate 28 which is closest to the second side portion 24 of the mounting part 22.

Figures 2A, 2B:
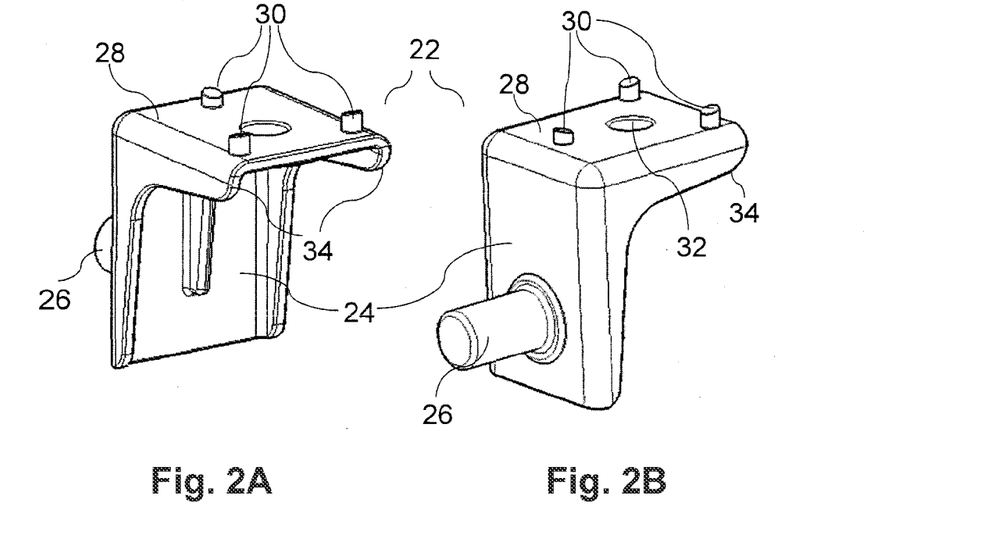
FIGS. 2A and 2B are a mounting part according to a first example embodiment in two perspective views.

FIGS. 2A and 2B show a mounting part 22 according to a first example embodiment in perspective views. The mounting part 22 includes a second side portion 24 from which a second holding pin 26 and a mounting plate 28 extend substantially perpendicular thereto. The second holding pin 26 and the mounting plate 28 extend from the second side portion 24 in opposite directions and are arranged in parallel with each other. The mounting plate 28 may be dimensioned to be smaller than the flange plate 8, as the mounting plate 28 does not have to bridge the distance between the two side portions 4, 24 in the mounting end position.

Three locking projections 30 may be arranged on the side of the mounting plate 28 which faces the flange plate 8 in the mounting end position. The locking projections 30 are formed so that they can be inserted into the locking recesses 10. The locking projections 30 may have some play in the locking recesses 10, which facilitates the assembly and disassembly of the fastening device. The end region of the locking projections 30 may be chamfered to reduce the contact surface between the locking projections 30 and the flange plate 8 during the mounting process and to thus facilitate the mounting process thanks to the reduced friction. The frontmost locking projection 30 may also have a chamfer that is inclined downward in the extension direction of the second holding pin 26. A chamfer inclined downward in the extension direction of the second holding pin (i.e. in the mounting direction) can effectively prevent the frontmost locking projection 30 from bumping against the front edge of the flange plate 8 in the mounting process and from impeding the mounting process.

The mounting plate 28 may include a fastening hole 32 for passing through a fastening means (not shown), such as a screw. According to the arrangement of the locking recesses 10, the locking projections 30 may also be arranged around the fastening hole 32, wherein the locking projections 30 and the fastening hole 32 may be arranged symmetrically to a plant that is perpendicular to the mounting plate 28 and includes the longitudinal axis of the second holding pin 26.

The mounting part 22 may further include a pair of guide collars 34 or guide rails 34, which may be formed on the lateral edges of the mounting plate 28. The pair of guide collars 34 may at least partly be connected to the lateral edges of the second side portion 24, which increases the rigidity of the mounting part 22. The guide collars 34 may thus also be referred to as stiffening collars or stiffening rails. The mounting plate 28 and the guide collars 34 may be formed such that the mounting plate 28 can be arranged between the guide collars 18 of the flange part 2 with some play and can be guided laterally by the guide collars 18 during the mounting process.

Figure 3:
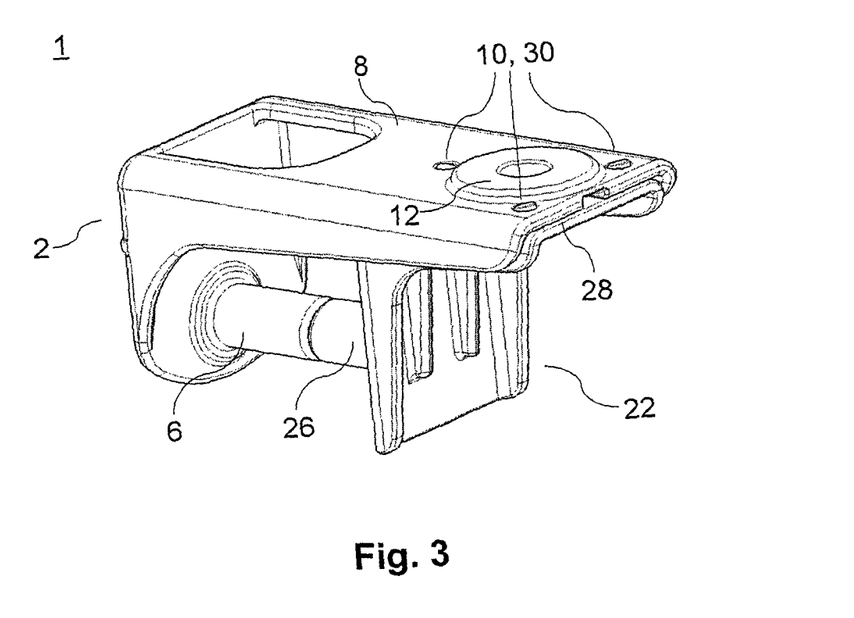
FIG. 3 a perspective view of a fastening device according to a first example embodiment in the mounting end position.

FIG. 3 shows a perspective view of a fastening device 1 according to a first example embodiment in the mounting end position. In the mounting end position, the first holding pin 6 and the second holding pin 26 face each other and are aligned to each other. In the mounting end position, the first holding pin 6 and the second holding pin 26 may form an almost continuous cylinder for holding an elastic hang-on part. Moreover, in the mounting end position, the flange plate 8 rests on or at the mounting plate 28. Further, in the mounting end position, the locking projections 30 of the mounting plate 28 are arranged in or inserted into the locking recesses 10 of the flange plate 8. The tips of the locking projections 30 may protrude out of the locking recesses 10. The locking projections 30, in particular the upper ends thereof, are arranged below the height level of the bearing surface 12 in the mounting end position though.

Figure 4:
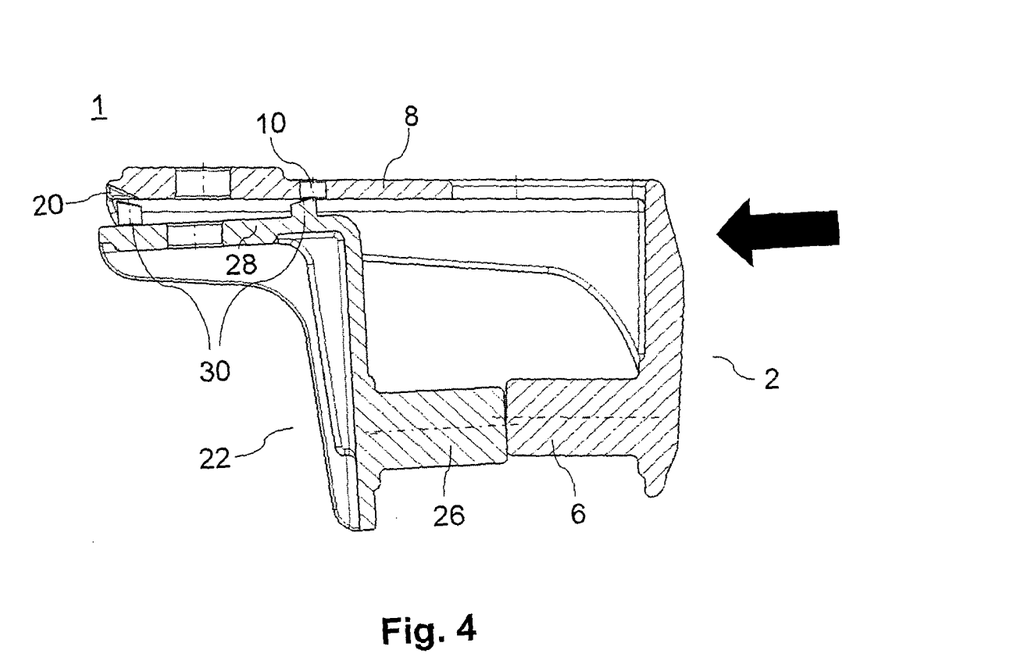
FIG. 4 a sectional view of the fastening device according to the first example embodiment in a displacement position.

FIG. 4 shows a sectional view of the fastening device 1 according to the first example embodiment in a displacement position. In the displacement position, the first holding pin 6 and the second holding pin 26 are not aligned to each other. "Not aligned to each other" may refer to that the longitudinal axis of the first holding pin 6 and the longitudinal axis of the second holding pin 26 intersect each other and enclose an angle, that they are arranged in a skewed way, or that they are arranged in parallel.

The displacement position shown in FIG. 4 must be overcome so that the flange part 2 and the mounting part 22 can be brought to the mounting end position by a movement toward each other substantially along the extension direction of the holding pins. The mounting direction is indicated by an arrow. During the movement toward each other substantially along the extension direction of the holding pins, the flange part 2 and the mounting part 22 (i.e. the fastening device 1) are brought to the displacement position by the locking projections 30. Due to locking projections 30 being formed on the upper side (the side facing the flange plate 8) of the mounting plate 28, the flange plate 8 cannot slide directly on the mounting plate 28, but needs to slide on at least one of the locking projections 30, so that there is a distance and/or an angle between the flange plate 8 and the mounting plate 28. In this state, the holding pins 6, 26 are not aligned to each other. Only if the flange part 2 and the mounting part 22 have been pushed together to such an extent that the locking projections 30 can enter the locking recesses 10 can be fastening device 1 be brought to the mounting end position in which the flange plate 8 rests against the mounting plate 28 and the holding pins are aligned to each other. The guide 20 formed at the front edge of the flange plate 8 helps to bring the fastening device 1 to the displacement position without problems during the movement of the flange part 2 and the mounting part 22 toward each other substantially along the extension direction of the holding pins 6, 26, without the flange plate 8 getting wedged at the frontmost locking projection 30.

Figure 5:
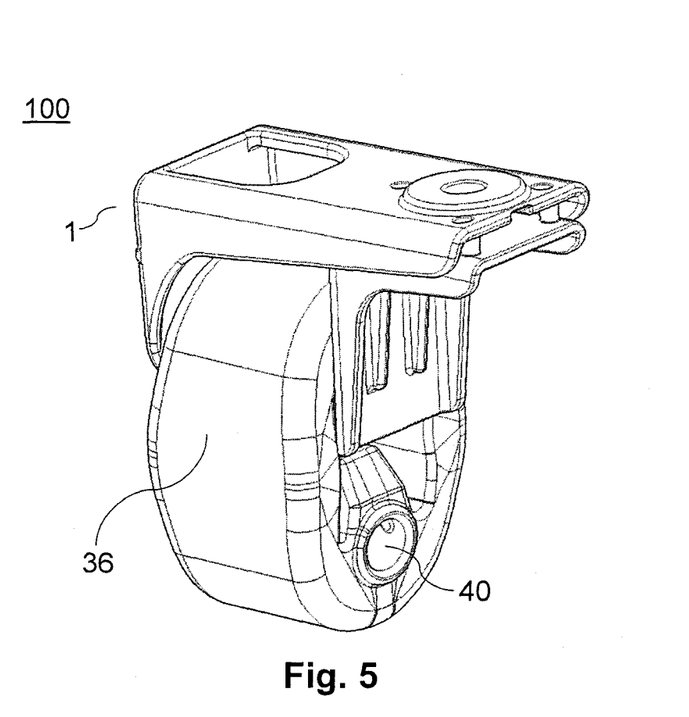
FIG. 5 a perspective view of a hanging device according to a first example embodiment in a displacement position.
Figure 6:
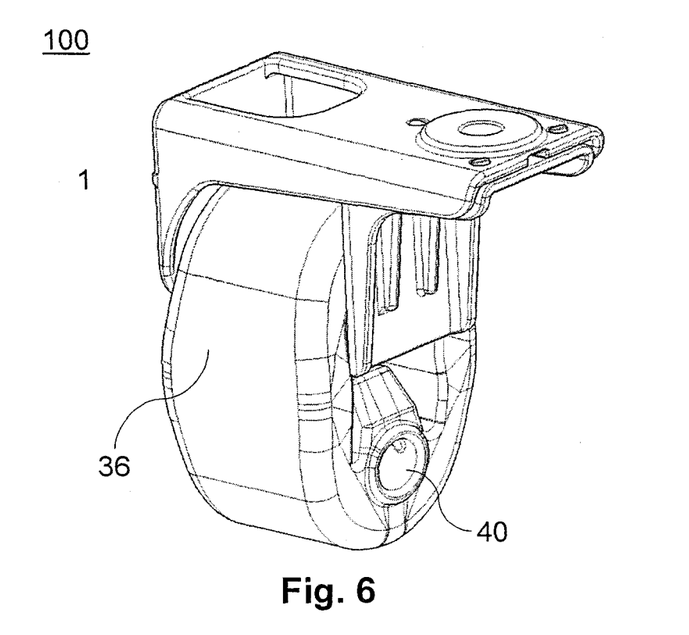
FIG. 6 a perspective view of the hanging device according to the first example embodiment in a mounting end position.
Figure 7:
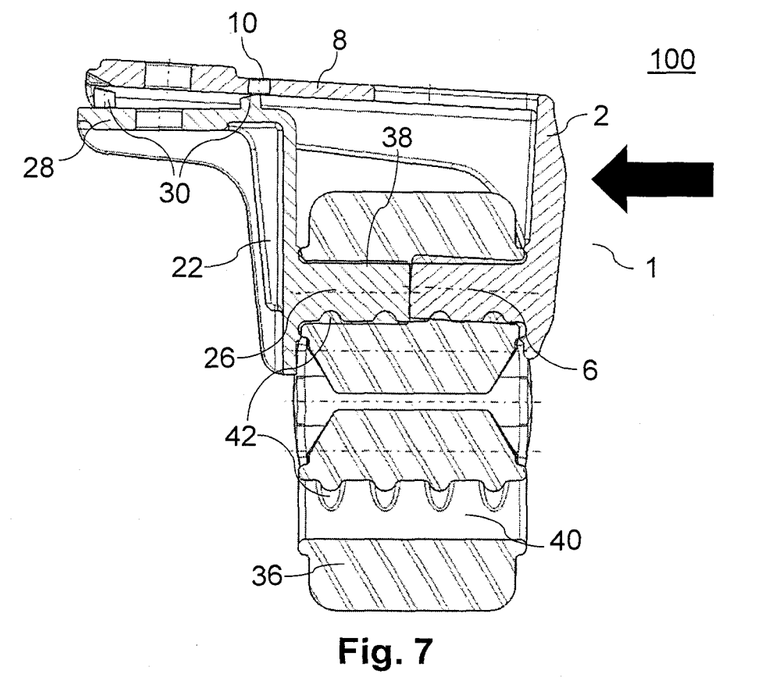
FIG. 7 a sectional view of the hanging device according to the first example embodiment in the displacement position.
Figure 8:
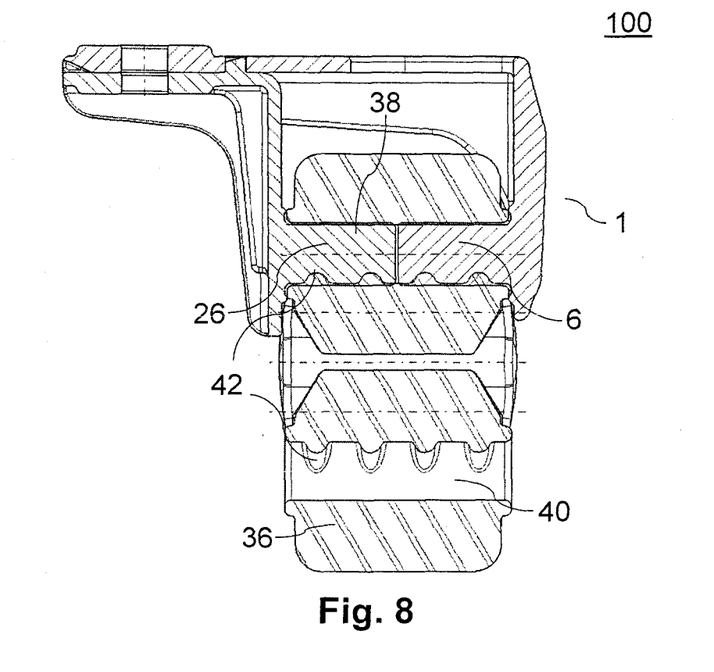
FIG. 8 a sectional view of the hanging device according to the first example embodiment in the mounting end position.

FIG. 5 and FIG. 6 show perspective views of a hanging device 100 according to a first example embodiment in the displacement position and in the mounting end position, respectively. FIG. 7 and FIG. 8 shows sectional views of the hanging device 100 in the displacement position and in the mounting end position, respectively. The hanging device 100 differs from the fastening device 1 only in that it further includes an elastic hang-on part 36. The fastening device 1 shown in FIGS. 5 to 8 is identical with the above-described fastening device 1. The mounting direction is indicated by an arrow in FIG. 7.

The elastic hang-on part 36 serves to pivotably hang an exhaust system on the fastening device 1, i.e. the hanging device 100 serves to pivotably hang an exhaust system (not shown) on a vehicle chassis (not shown). The elastic hang-on part 36 includes a hanging hole 38 for receiving the first and second holding pins 6, 26. Further, the elastic hang-on part 36 includes a hang-on hole 40 for pivotably receiving a fastening pin (not shown) of an exhaust system. The hanging hole 38 and/or the hang-on hole 40 may include ribs 42 on their inner walls, which provide for improved hold of the first holding pin 6, the second holding pin 26 and/or the fastening pin. The elastic hang-on part 36 may be formed mirror-symmetrically, so that the hanging hole 38 and the hang-on hole 40 are formed to be equal and are interchangeable with respect to their functions.

FIG. 7 shows the hanging device 100 according to the first example embodiment in a state shortly before the mounting end position is reached. The hanging device 100 or the fastening device 1 thereof is in the displacement position in this state. By the first and second holding pins 6, 26 being inserted into the hanging hole 38, a force from the elastic hang-on part 36, in particular from the inner wall of the hanging hole 38, acts on the first holding pin 6 and/or on the second holding pin 26 in the displacement position, wherein this force is intended to bring the holding pins 6, 26 back to the mutually aligned position.

FIG. 7 suggests that only the longitudinal axis of the first holding pin 6 of the flange part 2 is not aligned with respect to longitudinal axis of the hanging hole 38. The longitudinal axis of the second holding pin 26 of the mounting part 22, however, is aligned with respect to the longitudinal axis of the hanging hole 38. This is to be understood as a simplified representation. Usually, also the longitudinal axis of the second holding pin 26 will deviate at least slightly from the longitudinal axis of the hanging hole 38, as a force from the flange plate 8 acts on at least one locking projection 30 of the mounting plate 28 in the displacement position. Due to the greater leverage, the displacement of the flange part 2 with respect to the elastic hang-on part 36 (the deviation of the longitudinal axis of the first holding pin 6 from the longitudinal axis of the hanging hole 38) will usually be greater than the displacement of the mounting part with respect to the elastic hang-on part 36. However, the hanging device 100 can be configured such that the displacement of the mounting part 22 with respect to the elastic hang-on part 36 is greater than the displacement of the longitudinal axis of the flange part 2 with respect to the elastic hang-on part 36. To this end, shape and/or size of the first holding pin 6 and/o of the second holding pin 26 can be set suitably. Alternatively or in addition, shape and/or size of the hanging hole 38 can be set suitably.

Figure 9:
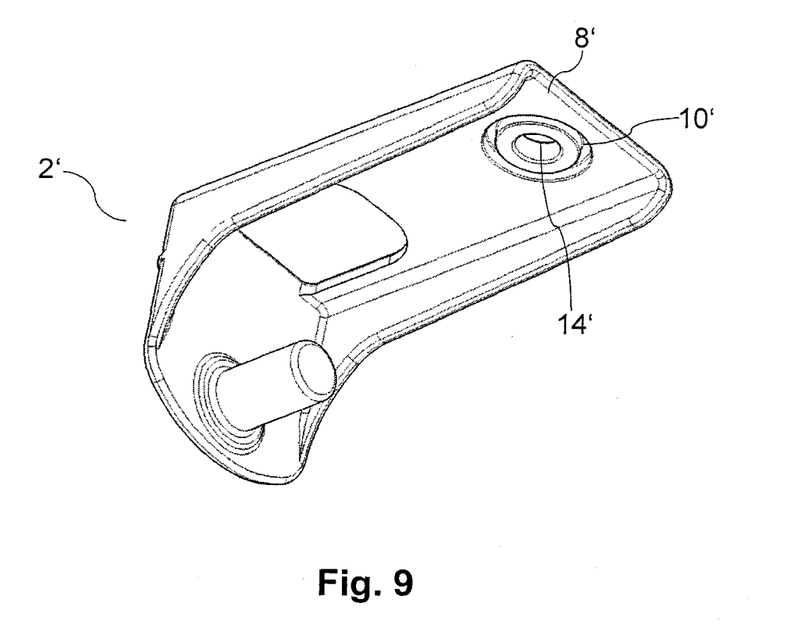
FIG. 9 a perspective view of a flange part according to a second example embodiment.
Figure 10:
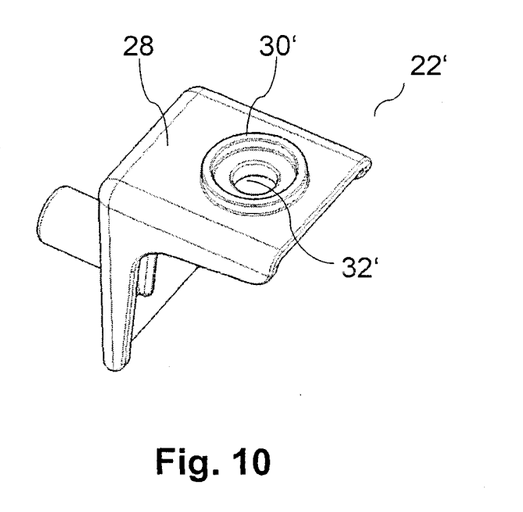
FIG. 10 a perspective view of a mounting part according to a second example embodiment.
Figure 11:
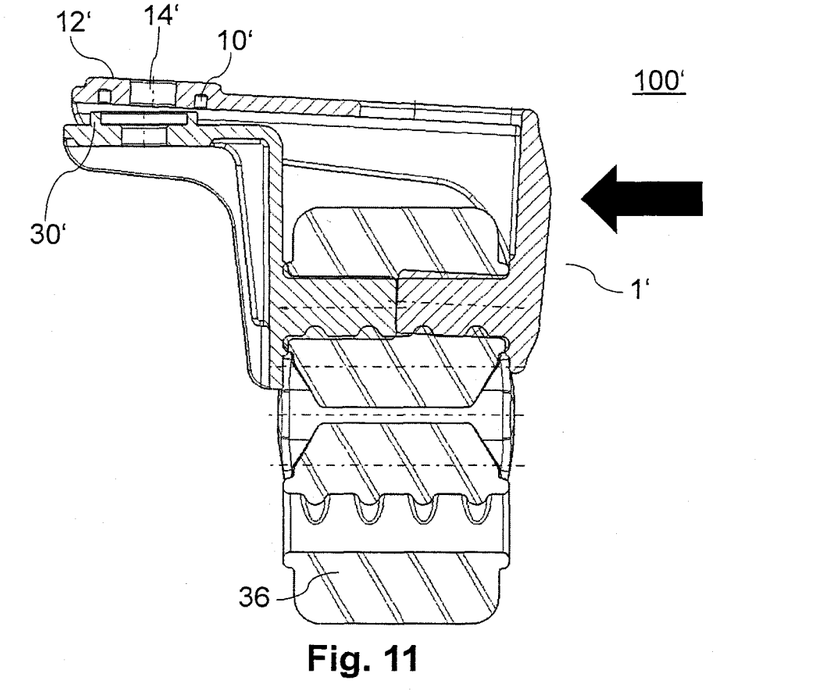
FIG. 11 a sectional view of a hanging device according to a second example embodiment in a displacement position.
Figure 12:
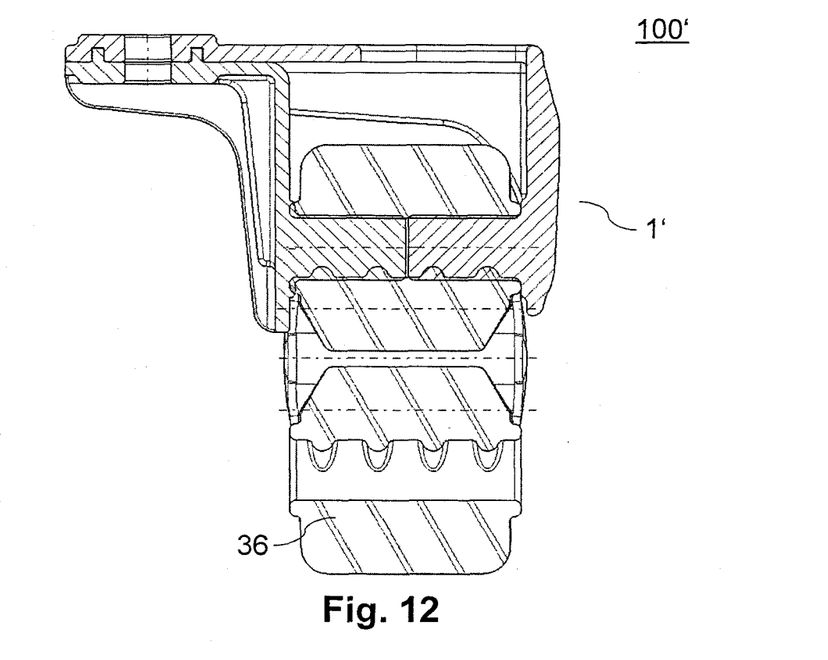
FIG. 12 a sectional view of the hanging device according to the second example embodiment in the mounting end position.

FIG. 9 shows a perspective view of a flange part 2' according to a second example embodiment. FIG. 10 shows a perspective view of a mounting part 22' according to a second example embodiment. FIG. 11 and FIG. 12 show sectional vies of a hanging device 100' according to a second example embodiment in a displacement position and in the mounting end position, respectively.

The flange part 2' according to the second example embodiment differs from the above-described flange part 2 of the first example embodiment only in that an annular groove 10' is provided as a locking recess 10', instead of the three locking recesses 10. The annular groove 10' is open to the side that rests against the mounting plate 28' in the mounting end position. The annular groove 10' is formed to be concentric around the fastening hole 14'.

The mounting part 22' according to the second example embodiment differs from the above-described mounting part 22 of the first example embodiment only in that an annular projection 30' is provided instead of the three locking projections 30. The annular projection 30' projects on the side that rests on the flange plate 8' in the mounting end position. The annular projection 30' is formed to be concentric around the fastening hole 32'. The flange part 2' and the mounting part 22' together form a fastening device 1' according to the second example embodiment.

The hanging device 100' according to the second example embodiment differs from the above-described hanging device 100 of the first example embodiment only in that the fastening device 1' according to the second example embodiment is provided instead of the fastening device 1 of the first example embodiment. The elastic hang-on part and the basic functionality are the same as in the first example embodiment.

Configuring the locking recess as an annular groove 10' has the advantage of a good locking effect. Moreover, it is possible to make the locking projection more compact, as the annular groove 10' is only open to one side and thereby the region below the bearing surface 12' around the fastening hole 14' can be used effectively.

Figure 13:
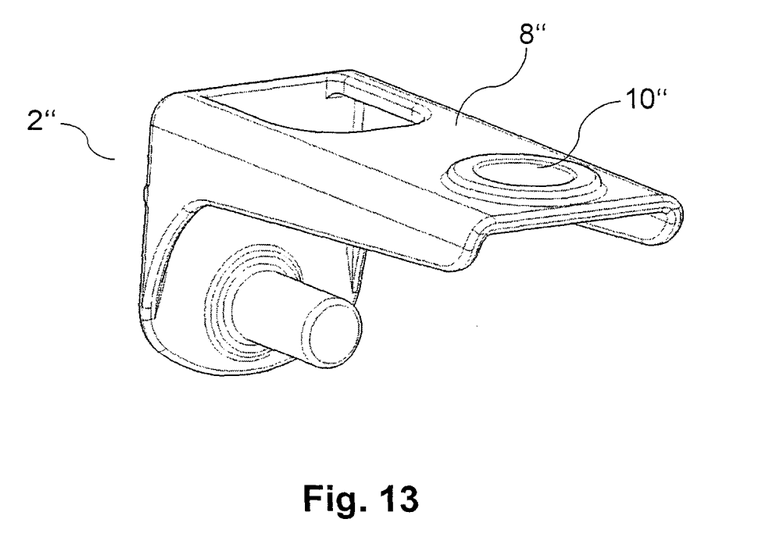
FIG. 13 a perspective view of a flange part according to a third example embodiment.
Figure 14:
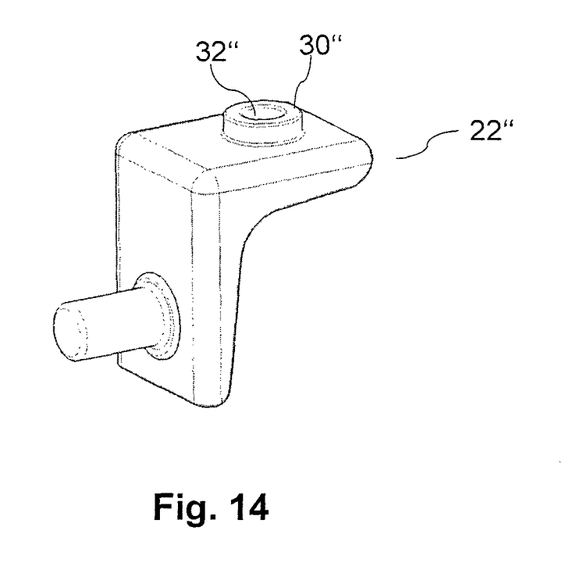
FIG. 14 a perspective view of a mounting part according to a third example embodiment.
Figure 15:
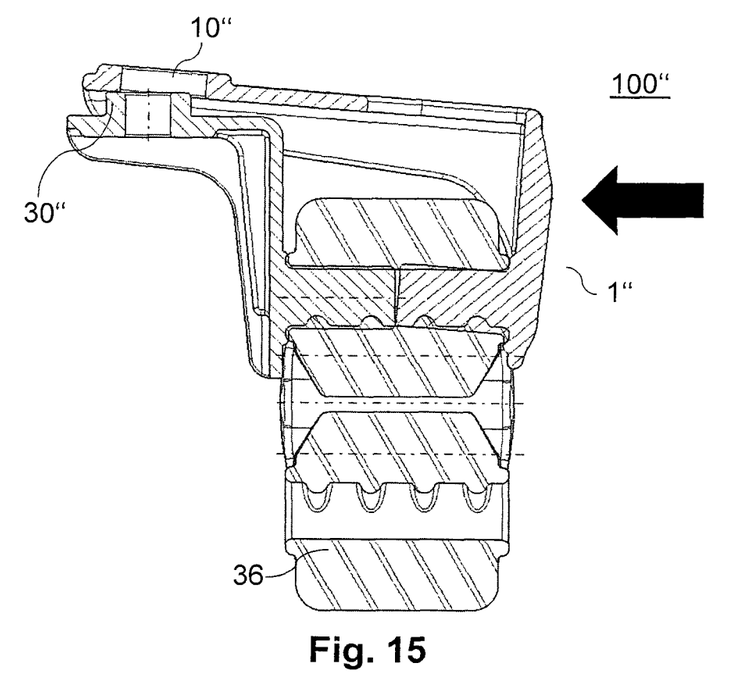
FIG. 15 a sectional view of a hanging device according to a third example embodiment in a displacement position.
Figure 16:
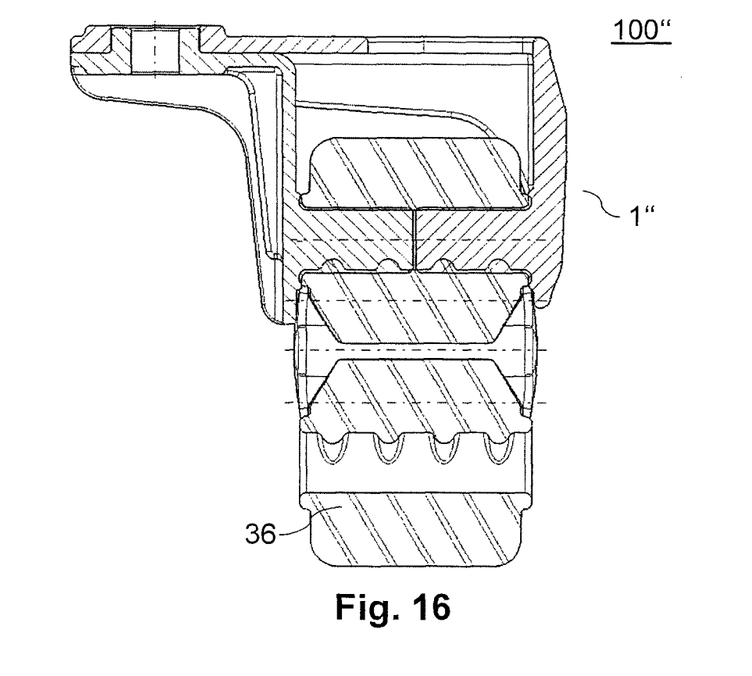
FIG. 16 a sectional view of the hanging device according to the third example embodiment in the mounting end position.

FIG. 13 shows a perspective view of a flange part 2" according to a third example embodiment. FIG. 14 shows a perspective view of a mounting part 22" according to a third example embodiment. FIG. 15 and FIG. 16 shows sectional vies of a hanging device 100" according to a third example embodiment in a displacement position and in the mounting end position, respectively.

The flange part 2" according to the third example embodiment differs from the above-described flange part 2' of the second example embodiment only in that a cylindrical hole 10" is provided as the locking recess 10" instead of the annular groove 10'. The cylindrical hole 10" is open to both sides. The shape of the hole 10" is not limited to a cylindrical shape through. The inner contour of the hole is matched to the outer contour of the locking projection.

The mounting part 22" according to the third example embodiment differs from the above-described mounting part 22' of the second example embodiment only in that the annular projection 30" has an inside diameter that corresponds to the inside diameter of the fastening hole 32". In other words, the inner wall of the annular projection 30" also constitutes the inner wall of the fastening hole 32" or goes seamlessly thereinto. The wall strength of the annular projection 10" is substantially thicker than in the second embodiment. The locking projection of the third embodiment could thus also be referred to as a "dome-shaped projection" 10". The annular projection 30" projects on the side that rests against the flange plate 8. The annular projection 30" is arranged concentrically around the fastening hole 32". The flange part 2" and the mounting part 22" together form a fastening device 1" according to the third example embodiment.

The hanging device 100" according to the third example embodiment differs from the above-described hanging device 100 of the first example embodiment only in that the fastening device 1" according to the third example embodiment is provided instead of the fastening device 1 of the first example embodiment. The elastic hang-on part and the basic functionality are the same as in the second example embodiment.

The configuration of the locking recess 10" and of the locking projection 30" according to the third example embodiment allows a cost-effective production and simple assembly of the fastening device 1".

This written description uses examples to disclose the embodiments, including the best mode, and also to enable any person skilled in the art to practice the disclosure, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fastening device for fastening an elastic hang-on part for hanging at least a part of an exhaust system on a motor vehicle, comprising:
    a flange part having a first holding pin; and
    a mounting part having a second holding pin,
    wherein the first holding pin and the second holding pin are adapted to, together, hold the elastic hang-on part,
    wherein the flange part comprises a first side portion and a flange plate, wherein the first holding pin extends substantially perpendicular away from the first side portion and the flange plate extends substantially perpendicular in the same direction as the first holding pin away from the first side portion,
    wherein the mounting part comprises a second side portion and a mounting plate, wherein the second holding pin extends substantially perpendicular away from the second side portion and the mounting plate extends substantially perpendicular in a direction opposite to the extension direction of the second holding pin away from the second side portion,
    wherein the first and second holding pins are configured to extend through an aperture formed in the elastic hang-on part,
    wherein the flange plate and the mounting plate form a locking mechanism that comprises a locking projection and a locking recess,
    wherein in a mounting end position, the first holding pin and the second holding pin face each other and are aligned to each other, the flange plate rests against the mounting plate, and the locking projection is inserted into the locking recess, and
    wherein the flange part and the mounting part are configured such that they can be brought to the mounting end position by a movement toward each other substantially along the extension direction of the holding pins.

2. The fastening device according to claim 1, wherein the mounting plate comprises the locking projection and the flange plate comprises the locking recess, or the flange plate comprises the locking projection and the mounting plate comprises the locking recess.

3. The fastening device according to claim 1, wherein in the mounting end position, the locking projection and the locking recess are arranged substantially symmetrically to a plane that is perpendicular to the flange plate and that includes the longitudinal axes of the first holding pin and of the second holding pin.

4. The fastening device according to claim 1, wherein the locking projection is formed as an annular projection.

5. The fastening device claim 1, wherein the locking recess is formed as one of an annular groove and a cylindrical hole.

6. The fastening device according to claim 1, wherein the locking projection comprises a chamfer.

7. The fastening device according to claim 1, wherein at least one of the flange plate and the mounting plate comprises a guide configured to guide the locking projection.

8. The fastening device according to claim 1, wherein the first holding pin and the second holding pin have approximately the same length.

9. The fastening device according to claim 1, wherein the first and second holding pins are generally cylindrical.

10. A hanging device for hanging at least a part of an exhaust system on a motor vehicle, the hanging device comprising:
a fastening device comprising:
a flange part having a first holding pin; and
a mounting part having a second holding pin,
wherein the first holding pin and the second holding pin are adapted to, together, hold an elastic hang-on part,
wherein the flange part comprises a first side portion and a flange plate, wherein the first holding pin extends substantially perpendicular away from the first side portion and the flange plate extends substantially perpendicular in the same direction as the first holding pin away from the first side portion,
wherein the mounting part comprises a second side portion and a mounting plate, wherein the second holding pin extends substantially perpendicular away from the second side portion and the mounting plate extends substantially perpendicular in a direction opposite to the extension direction of the second holding pin away from the second side portion,
wherein the first and second holding pins configured to extend through an aperture formed in the elastic hang-on part,
wherein the flange plate and the mounting plate form a locking mechanism that comprises a locking projection and a locking recess,
wherein in a mounting end position, the first holding in and the second holding pin face each other and are aligned to each other, the flange plate rests against the mounting plate, and the locking projection is inserted into the locking recess, and
wherein the flange part and the mounting part are configured such that they can be brought to the mounting end position by a movement toward each other substantially along the extension direction of the holding pins; and
the elastic hang-on part;
wherein the first holding pin and the second holding pin are arranged in the aperture of the elastic hang-on part in the mounting end position.

11. The hanging device according to claim 10, wherein the mounting plate comprises the locking projection and the flange plate comprises the locking recess, or the flange plate comprises the locking projection and the mounting plate comprises the locking recess.

12. The hanging device according to claim 10, wherein in the mounting end position, the locking projection and the locking recess are arranged substantially symmetrically to a plane that is perpendicular to the flange plate and that includes the longitudinal axes of the first holding pin and of the second holding pin.

13. The hanging device according to claim 10, wherein the locking projection is formed as an annular projection.

14. The hanging device according to claim 10, wherein the locking recess is formed as one of an annular groove and a cylindrical hole.

15. The hanging device according to claim 10, wherein the locking projection comprises a chamfer.

16. The hanging device according to claim 10, wherein at least one of the flange plate and the mounting plate comprises a guide configured to guide the locking projection.

17. The hanging device according to claim 10, wherein the first holding pin and the second holding pin have approximately the same length.

18. A method for mounting a hanging device for hanging at least a part of an exhaust system on a motor vehicle, the method comprising:
providing a fastening device that includes a flange part having a first holding pin, and a mounting part having a second holding pin, wherein the first holding pin and the second holding pin are adapted to, together, hold an elastic hang-on part, wherein the flange part comprises a first side portion and a flange plate, wherein the first holding pin extends substantially perpendicular away from the first side portion and the flange plate extends substantially perpendicular in the same direction as the first holding pin away from the first side portion, wherein the mounting part comprises a second side portion and a mounting plate, wherein the second holding pin extends substantially perpendicular away from the second side portion and the mounting plate extends substantially perpendicular in a direction opposite to the extension direction of the second holding pin away from the second side portion, wherein the first and second holding pins are configured to extend through an aperture formed in the elastic hang-on part, wherein the flange plate and the mounting plate form a locking mechanism that comprises a locking projection and a locking recess, wherein in a mounting end position, the first holding pin and the second holding pin face each other and are aligned to each other, the flange plate rests against the mounting plate, and the locking projection is inserted into the locking recess, and wherein the flange part and the mounting part are configured such that they can be brought to the mounting end position by a movement toward each other substantially along the extension direction of the holding pins;
providing the elastic hang-on part having the aperture;
inserting the second holding pin of the mounting part into the aperture from a side of the aperture; and
inserting the first holding pin of the flange part into the aperture from another side of the aperture, so that the flange plate is pushed over the mounting plate until the locking projection latches in the locking recess.

19. The method according to claim 18, wherein providing a fastening device comprises providing a fastening device in which the locking projection is formed as an annular projection.

* * * * *